Figures 1, 2:
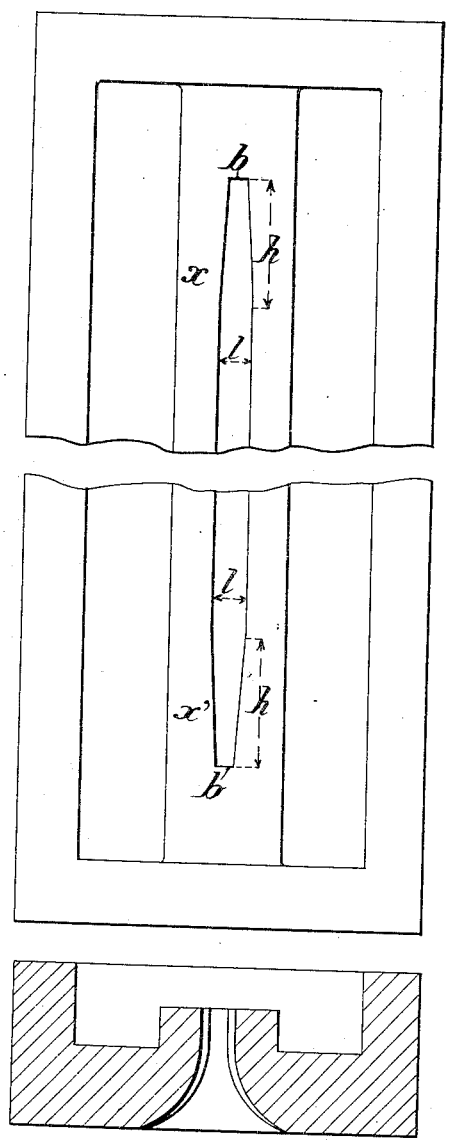

No. 837,822. PATENTED DEC. 4, 1906.
E. FOURCAULT.
SUPPLYING FLOAT FOR DRAWING SHEETS OF GLASS.
APPLICATION FILED MAY 21, 1906.

Witnesses:

Inventor
Emile Fourcault
By James L. Norris
Atty.

UNITED STATES PATENT OFFICE.

EMILE FOURCAULT, OF LODELINSART, BELGIUM.

SUPPLYING-FLOAT FOR DRAWING SHEETS OF GLASS.

No. 837,822.      Specification of Letters Patent.      Patented Dec. 4, 1906.

Application filed May 21, 1906. Serial No. 318,043.

*To all whom it may concern:*

Be it known that I, EMILE FOURCAULT, glass manufacturer, a subject of the King of Belgium, residing at Lodelinsart, Belgium, have invented certain new and useful Improvements in Supplying-Floats for Drawing Sheets of Glass, of which the following is a specification.

In my United States Letters Patent No. 717,378, dated December 30, 1902, in order to obtain by drawing a sheet of glass of constant width the feeding must be insured constantly and uniformly in all the parts of the basis of formation. This result has been obtained with a float provided at its upper part with a long and narrow slot having a constant width. If this float is more or less dipped into the bath of molten glass, a sheet of glass having the required consistency spurts from the slot. This sheet is grasped and lifted up slowly by any suitable means for obtaining a continuous sheet of glass which solidifies by cooling, but having a constant width which is equal to the length of the slot of the float. The disposition of a slot having a uniform width has, however, a great disadvantage. The edges of the sheet thus drawn are provided with a swelling which is thicker than the rest of the sheet. Consequently the edges of the sheet are difficult or even impossible to anneal, and the sheet is broken during its drawing or when it is cut with a diamond.

This invention has for its object a supplying-float which prevents these disadvantages.

In the accompanying drawings, Figure 1 is a horizontal view of the supplying-float. Fig. 2 is a transversal section of this float.

The slot in the float instead of having a constant width is narrowed at its ends, which have a trapezoidal shape. If the ends of the slot have a triangular shape, there is, so to speak, no supply of glass in the acute angle and the glass must be wrenched by drawing. The edges of the sheet thus obtained are very thin and brittle and they are very often indented or barbed and not plain. This is due to the fact that the sheet is not sufficiently supplied with molten glass at the ends of the slot, that this molten glass adheres to the sides of the slot, and cannot be undone by the ascending molten glass. The presence of a light swelling is, however, indispensable for insuring a good drawing of the sheet. The swellings constitute at the basis of the sheet two ribs which are more rigid than the rest of the sheet, preventing the sheet from contracting or creasing on its width during the drawing. The best results are obtained if the ends $x$ $x'$ of the slot have the shape of a trapezium. The length of the little base $b$ of this trapezium is the two-thirds of the width $l$ of the slot or of the great base of the trapezium. The height $h$ of the trapezium is five to six inches.

Having thus described and ascertained the nature of my invention and in what manner the same may be performed, I declare that what I claim is—

1. A supplying-float for drawing a continuous sheet of glass having a slot the ends of which are tapered and have the shape of a trapezium, substantially as described.

2. A supplying-float for drawing a continuous sheet of glass having a slot with the ends of less width than the intermediate portion thereof.

In testimony whereof I have hereunto set my hand in presence of two subscribing witnesses.

EMILE FOURCAULT.

Witnesses:
ARTHUR REGNIERS,
LEOPOLD BASTIN.